(12) United States Patent
Patterson et al.

(10) Patent No.: US 11,834,163 B2
(45) Date of Patent: Dec. 5, 2023

(54) AERIAL VEHICLE WITH TAPE SPRING ARMS

(71) Applicant: Massachusetts Institute of Technology, Cambridge, MA (US)

(72) Inventors: David Patterson, Hudson, NH (US); Mark Silver, Bedford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 30 days.

(21) Appl. No.: 17/196,102

(22) Filed: Mar. 9, 2021

(65) Prior Publication Data

US 2021/0354812 A1 Nov. 18, 2021

Related U.S. Application Data

(60) Provisional application No. 63/024,698, filed on May 14, 2020.

(51) Int. Cl.
*B64C 27/33* (2006.01)
*B64C 1/30* (2006.01)
*B64C 39/02* (2023.01)

(52) U.S. Cl.
CPC .................. *B64C 27/33* (2013.01)

(58) Field of Classification Search
CPC ........... B64C 1/063; B64C 1/30; B64C 27/33; B64C 27/50; B64C 27/20; B64C 27/08; B64C 39/024; B64C 2201/027; B64C 2201/108; B64C 2201/042; B64C 2201/048; B64C 2201/102
See application file for complete search history.

(56) References Cited

U.S. PATENT DOCUMENTS

| 7,152,827 B2* | 12/2006 | McGeer | B64F 1/06 244/49 |
| 7,354,033 B1 | 4/2008 | Murphey et al. | |
| 2016/0176520 A1* | 6/2016 | Goldstein | B64C 39/024 244/17.23 |
| 2018/0170510 A1* | 6/2018 | Brock | B64C 27/12 |
| 2018/0178896 A1 | 6/2018 | Lee | |

(Continued)

FOREIGN PATENT DOCUMENTS

FR 2909972 A1 6/2008
JP 6587371 B1 10/2019

OTHER PUBLICATIONS

International Search Report and Written Opinion dated May 25, 2021, for Application No. PCT/US2021/021462.

*Primary Examiner* — Audrey B. Walter
*Assistant Examiner* — Dapinder Singh
(74) *Attorney, Agent, or Firm* — Wolf, Greenfield & Sacks, P.C.

(57) ABSTRACT

An aerial vehicle with a plurality of selectively collapsible arms capable of transitioning between an extended state and a contracted state is described. In the extended position, the distance between the main body of the vehicle and the rotor associated with each arm is maximized. In the contracted state, the distance between the main body of the vehicle and the rotor associated with each arm is minimized. In certain embodiments, each of the arms may include one or more tape springs that are biased to selectively move the associated one or more rotors of each arm between the retracted and extended states.

20 Claims, 5 Drawing Sheets

(56) References Cited

U.S. PATENT DOCUMENTS

2018/0354620 A1* 12/2018 Baek ..................... B64C 39/024
2020/0094960 A1    3/2020 Wu et al.
2021/0078704 A1*  3/2021 Blakstad ............... H01M 50/20

* cited by examiner

AERIAL VEHICLE WITH TAPE SPRING ARMS

CROSS-REFERENCE TO RELATED APPLICATIONS

This application claims the benefit under 35 U.S.C. § 119(e) to U.S. provisional application Ser. No. 63/024,698, filed May 14, 2020, the disclosure of which is incorporated herein by reference in its entirety.

GOVERNMENT LICENSE RIGHTS

This invention was made with Government support under FA8702-15-D-0001 awarded by the U.S. Air Force. The Government has certain rights in the invention.

FIELD

Disclosed embodiments relate generally to aerial vehicles, specifically to aerial vehicles with collapsible tape spring arms.

BACKGROUND

Many aerial vehicles, including various drones, are constructed with a number of rotor assemblies attached to fixed arms extending radially outward from a main body. This form factor is popular due to the ease with which it can be scaled, constructed, and piloted.

SUMMARY

In one embodiment, an aerial vehicle includes a main body and a plurality of arms connected to and extending radially outward from the main body. Each arm of the plurality of arms includes a rotor connected to an associated arm, and each arm is configured to move between a contracted state and an extended state. Additionally, moving each arm between the contracted state and the extended state displaces the associated rotor radially outward from the main body.

In another embodiment, a method of deploying an aerial vehicle includes: extending a plurality of arms of an aerial vehicle radially outward from a main body of the aerial vehicle from a contracted state to an extended state, where each arm of the plurality of arms includes a rotor connected to the associated arm. Moving each arm between the contracted state and the extended state also moves the associated rotor radially outwards relative to the main body.

In yet another embodiment, an aerial vehicle includes a main body, at least one tape spring attached to and extending outward from the main body, and a rotor connected to a distal portion of the tape spring located opposite a proximal portion of the tape spring attached to the main body. The at least one tape spring is biased towards an extended state.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
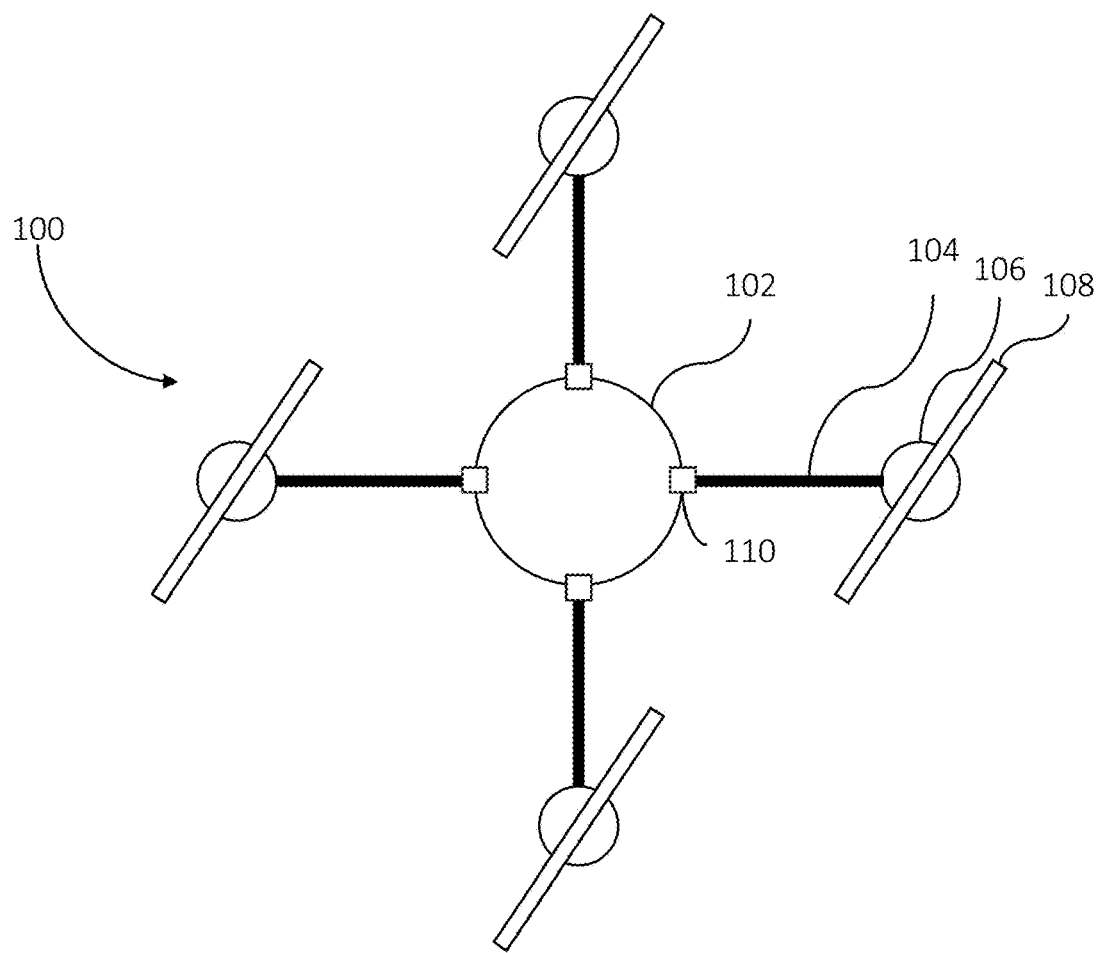
FIG. 1A is a top plan view of an aerial vehicle with its tape spring arms in the extended state.

The inventors have recognized the shortcomings associated with the transportation and assembly of existing remote aerial vehicles. These vehicles are often constructed with a number of fixed arms extending radially from a main body. The fixed nature of these rigid arms may be beneficial for performance, however it is inherently space inefficient. It becomes even more space inefficient as aerial vehicles are scaled up to meet desired performance characteristics, such as carrying capacity or payload. These radial arms are often made from lightweight materials, which can be easily damaged. As such, transporting such craft often involves the use of a large protective case, which poses challenges when traveling with or storing the remote aerial vehicle.

In an effort to make aerial vehicles more space efficient, some come equipped with removable or rigid arms that fold inwards. Tools are used with many of these removable arms to assemble and disassemble the vehicle. Lacking either the tools or knowledge may prevent people from being able to operate these aerial vehicles. Even for those with the correct tools and knowledge, set up may be difficult and/or time consuming, especially when environmental conditions are not favorable. Additionally, removable arms may also pose wire routing and connection issues. Additionally, rigid folding arms may not offer a truly effective size reduction of a craft since many vehicles including folding arms have elongated larger main bodies to accommodate the presence of these foldable arms.

In view of the above, the inventors have recognized the benefits associated with an aerial vehicle where a plurality of arms extending radially out from the main body may be selectively moved between an extended and contracted state to deploy one or more rotors associated with each of the plurality of arms. This movement may include a linear displacement of the arms relative to the main body in a direction that is substantially parallel to an axial direction of the arms themselves. For example, in some embodiments, each arm may include one or more tape springs that may be extended or contracted to move the one or more rotors of each arm between the desired extended and/or retracted state. Alternatively, the arms may be made from a sufficiently elastic structures, such as a tape spring, that may be elastically deformed to the contracted state where it may be deformed towards the body of an aerial vehicle and the arms may be elastically biased to a stable configuration corresponding to the extended configuration.

As noted above, in certain embodiments, each of the plurality of arms may be configured to transition between a contracted state and an extended state. In certain embodiments, moving each of the plurality of arms from the contracted state to the extended state may displace the rotor associated with each arm radially outward from the main body of the aerial vehicle. In some instances, this may involve a linear displacement of the portions of the arms extending radially outwards from the body in a direction that is parallel to an axial direction in which the arms extend. Alternatively, the arms may be elastically deformed to the contracted state and the arms may be biased towards the extended configuration such that the arms may elastically deform back to an undeformed configuration corresponding to the extended configuration. Such an aerial vehicle may be configured to selectively reside in a contracted state when not in use, for example when the vehicle is being stored or transported, and an extended state when in use, for example during flight. Residing in the contracted state when not in use may provide benefits including but not limited to reduced risk of damage as well as increased space and/or packing efficiency. Residing in the expanded state during operation may, for example, enable the aerial vehicle to achieve desired performance characteristics.

In certain embodiments, each of the plurality of arms may comprise at least one tape spring configured to selectively transition between a contracted state and an extended state. As such, each tape spring may be configured to operatively transition each of the plurality of arms between the contracted and extended states. A tape spring can be any thin walled strip of material with sufficient lateral and rotational rigidity to enable stable flight in the extended state while being flexible enough to be wound into a coil in the contracted state. In some embodiments, a tape spring may have a curved cross-section in the extended state. Depending on the embodiment, a tape spring may be configured to uncoil and reside in the extended state when not restrained by an outside force may be said to be biased towards the extended state. Conversely, a tape spring that retracts into and coils onto itself without the application of an external force may be referred to as being biased towards a contracted state. Additionally, while in some embodiments a tape spring may extend and/or contract along its axial length, in other embodiments, a tape spring may simply be fixed to the body and associated rotor of an aerial vehicle such that the tape spring may be deformed between the desired contracted and extended states as detailed further below. While any appropriate material may be used for a tape spring, tape springs are often made from metal (e.g., steel or aluminum) or composite materials (e.g., epoxy matrix reinforced carbon fabric). Thus, it should be understood that the tape springs of the present disclosure may be made with any appropriate combination of construction and/or material to achieve a desired combination of characteristics (e.g., weight, rigidity, stiffness).

In some embodiments, such as those described above, the tape springs are biased towards the extended position, which may cause the arms to automatically transition from the contracted to the extended position. In such embodiments, a lock may be used to prevent this transition from spontaneously occurring. Thus, a method of operating an aerial vehicle may include locking or otherwise restraining the tape springs in the contracted state prior to releasing the lock and permitting the arms to extend radially outwards towards the extended state.

Tape spring dimensions may be varied to achieved desired properties. Dimensional properties of the tape spring (e.g., length, width, thickness, curvature, etc.) may be chosen to provide desired operating characteristics based on rotor characteristics (e.g., thrust, rotor blade length, etc.), desired vehicle performance (e.g., target acceleration, top speed, max altitude, flight time, range, payload, etc.), or other appropriate vehicle operating parameters. In certain embodiments, an aerial vehicle may include a plurality of collapsible arms, each with a tape spring between 100 mm and 1000 mm in length when extended. In certain embodiments, the tape spring may be between 10 mm and 250 mm in height. In certain embodiments, the tape spring may be between 0.1 mm and 2.5 mm in thickness. In certain embodiments, the tape spring may have a radius of curvature between 10 mm and 50 mm. Altering these dimensions may impact the stiffness, weight, and spring force of the tape spring. Any suitable dimensions may be chosen such that desired performance is achieved. Of course, while specific ranges are given above, size ranges both greater and less than those noted above are contemplated as a tape spring, or multiple tape springs, used to form an arm of an aerial vehicle may have any appropriate combination of parameters to provide a desired size and stiffness.

As noted above, in certain embodiments, it may be desirable to use multiple tape springs on each of the plurality of arms. Multiple tape springs may be included for structural purposes when, for example, the expected payload of the aerial vehicle exceeds a certain weight, the desired thrust of each rotor exceeds a certain amount, or when it is desired that the aerial vehicle be flown in harsh environmental conditions. In embodiments with multiple tape springs, the one or more tape springs may be arranged in any desired orientation. For example, some embodiments may have the tape springs arranged side by side, or nested front to back. The tape springs may be in direct contact, for example, if two tape springs were nested front to back. Alternatively, the tape springs may not be in direct contact, for example, if the tape springs are arranged side by side with a gap between them. In embodiments with multiple tape springs, the one or more tape springs may be attached to each other and/or the multiple tape springs may simply be attached to the main body and rotor using any appropriate type of connection.

Tape springs may be mounted to or otherwise attached to the main body and/or one or more associated rotors using any appropriate type of connection. In some embodiments, for example, the tape springs may be fastened to the main body and/or rotor of an aerial vehicle via rivets, threaded fasteners, hinges adhesives, welds, brazing, and/or any other appropriate type of connection. In some embodiments, the coil formed by the one or more tape springs when in the contracted state may be housed in an internal cavity of the main body or otherwise attached to the main body. In other embodiments, the coil may reside outside the main body including, for example, a tape spring including a coil housing, and coil contained therein, attached to an associated rotor with a distal portion of the tape spring attached to the main body. In either case, the one or more tape springs may be wound in any orientation or direction and may be attached to any appropriate portion of an aerial vehicle as the disclosure is not limited in this respect.

In some embodiments, it may be desirable to transmit electrical power and/or a control signal from the main body to each of the rotor assemblies. This may be desired, for example, in embodiments where a power source, such as a rechargeable battery, is located in the main body and where motors, such a brushless DC motors, are located with the rotors at the distal end of each of the plurality of arms. In certain embodiments, electric power may be transmitted by at least two electrical conductors configured to transmit electrical power and/or signal from the main body of the aerial vehicle to each of the rotors. These electrical conductors may, in certain embodiments, extend along at least a portion, and in some instances an entirety, of a length of the tape springs associated with each of the arms. In such embodiments, the conductors may also be configured to transition between a contracted and an extended state with the associated arm. In some embodiments, the at least two conductive elements may be located on an external surface of each of the plurality of arms. In other embodiments, the conductors may be routed inside the structure of each of the arms. For example, the conductors may be attached to or integrally formed with the tape springs. In such embodiments where the conductors are attached to the tape spring, the conductors may be attached via zip-ties, adhesives, wraps, brackets, threaded fasteners, or any other method known to those of skill in the art.

In some embodiments, additional electronic components, such as electronic speed controllers (ESCs) may be installed on each of the plurality of arms. These components may alter or in some other way condition the electrically current and/or signal transmitted between the main body and the rotor. Similar with the electrical conductors described above, these may be internal or external to each of the arms and may be attached to or housed within any appropriate portion of an aerial vehicle.

In certain embodiments, each of the plurality of arms may be biased towards the extended state. This may, in certain embodiments, cause the arms of the aerial vehicle to self-deploy without human intervention. This biasing may, for example, greatly reduce the time, effort, and complexity of deploying the aerial vehicle. It may also eliminate the use of tools when deploying the aerial vehicle. In systems in which an aerial vehicle is housed within a container, this biasing may enable the aerial vehicle to self-deploy and begin flight automatically after removal of the vehicle from the container as will be described in further detail later.

In certain embodiments, the aerial vehicle may further comprise one or more locks configured to selectively restrain each of the plurality of arms in the contracted state. These locks may be used to lock the plurality of arms, which may be biased towards the extended state, in a contracted state such that they do not expand during storage and transport of the aerial vehicle. In certain embodiments, a first portion of each lock may be located on the main body of the aerial vehicle and a second portion of each lock configured to releasably couple with the first portion may be located on an arm or rotor or vice versa. The lock may be magnetic, a physical latch, a hook and loop fastener, or any other suitable locking mechanism. In some embodiments, direct user manipulation may transition the lock from the locked to unlocked state. In other embodiments, the lock may be operated remotely such that it may transition from a locked to unlocked state upon receiving a wireless signal. In other embodiments still, the lock may change state independent of human intervention based on various operating parameters and/or operating commands.

In certain embodiments, it may be desirable to add additional features to reduce the size of the aerial vehicle beyond collapsible arms. For example, it may be desirable to configure each of the rotors of a vehicle such that the rotors may transition between a collapsed state and an expanded state. In the collapsed state, for example, each blade of the rotor may fold downward such that each blade becomes substantially vertical relative to a base of the vehicle and parallel to each other blade. In the expanded state, for example, each blade of the rotor may rotate upward relative to the base of the vehicle such that each blade becomes substantially horizontal and coplanar with each other blade. In alternate embodiments, the individual blades may have telescoping functionality. In other embodiments, the rotor blades may be selectively pivotable at a central location enabling them to overlap each other. The use of collapsible rotors may further reduce a footprint of a vehicle in a contracted state.

In some embodiments, an aerial vehicle with a plurality of collapsible arms may be a part of a system including a container with an internal cavity. In such embodiments, the aerial vehicle may be configured to fit inside the internal cavity of the container when its arms are in the contracted state. In embodiments wherein the rotor blades are also configured to be collapsible, the aerial vehicle may be sized and shaped to fit in the internal cavity of the container when both the arms and the rotor blades are in the collapsed state. Regardless of the specific design and/or operation of removal, once removed from the container, the vehicle may move from the collapsed state to the extended state as elaborated on below.

For the sake of clarity, aerial vehicles with four arms have been depicted in the figures. However, aerial vehicles may be configured with different numbers of arms depending on the application for which they are intended to be used. Thus, any number of collapsible arms may be used with the embodiments disclosed herein as the present disclosure is not limited in this respect.

For the sake of clarity, the embodiments depicted in the figures are illustrated as being tape springs that retract and extend along their axial length to deploy the rotors of an aerial vehicle. However, as noted above, the use of flexible arms, such as tape springs, that are fixedly attached to a body of an aerial vehicle and associated rotor are also contemplated. In such an embodiment, the flexible arms may be deformed towards the body to a contracted configuration. When released by a lock, container, or other restraining arrangement, the elastically deformed arms may deform back towards the stable undeformed state of the arms in the extended configuration to move the associated rotors radially outward from a body of the aerial vehicle. For example, the arms may be wrapped around a portion of a vehicle body in the contracted configuration and the arms may extend radially outward from the vehicle body in the extended configuration.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A-2B show a first embodiment of an aerial vehicle 100 with collapsible arms as described above. This first embodiment includes a main body 102, optional skids 112, or other appropriate landing gear located on a base of the main body, and four collapsible arms corresponding to four tape springs 104 extending radially outwards from the main body 102. A proximal portion of each of the tape springs is attached to the body and an opposing distal portion of each tape spring is attached to a one or more associated rotors 106 using any appropriate connection. The one or more associated rotors 106 may include associated rotor blades 108 and a motor, not depicted, to rotate the rotor blades. Additionally, in some embodiments, one or more locks 110 may be associated with each of the one or more tape springs forming each arm. The locks may have any appropriate construction capable of restraining motion of the one or more arms and may include portions located on either of the main body, the arms, or both. For example, a lock may include a latch, a friction brake, a mechanical interference, magnets, and/or any other appropriate construction capable of maintaining the tape springs which are biased radially outwards from the body in the contracted state. It should also be noted that each of the arms 104 may comprise at least two electrical conductors 113 extending from the body to the rotors along a length of each associated arm for transmitting electronic power and/or a control signal from the main body 102 to each of the rotors 106. It should be appreciated that while in some embodiments, the conductors 113 may be distinct from the arms (as shown in FIG. 2A), in other embodiments, the tape springs 104 themselves may act as conductors. For example, each tape spring 104 may be a first conductor and an insulated wire extending along a length of the arms may be the second conductor. In some embodiments, any of the tape springs 104 may include circuit board traces to render the arm conductive.

Figure 1B:
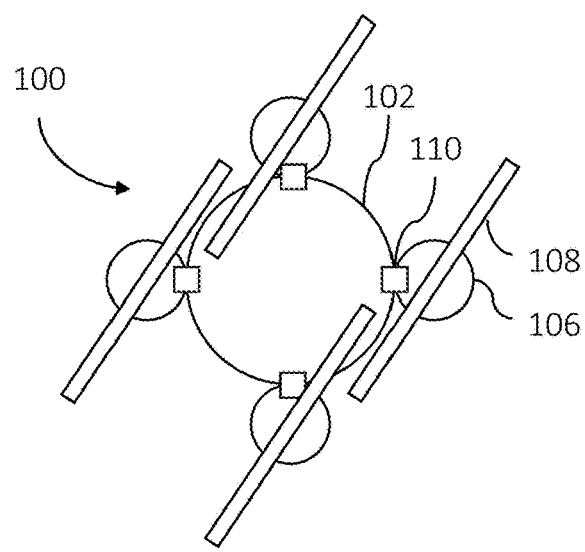
FIG. 1B is a top plan view of an aerial vehicle with its tape spring arms in the contracted state.
Figure 2A:
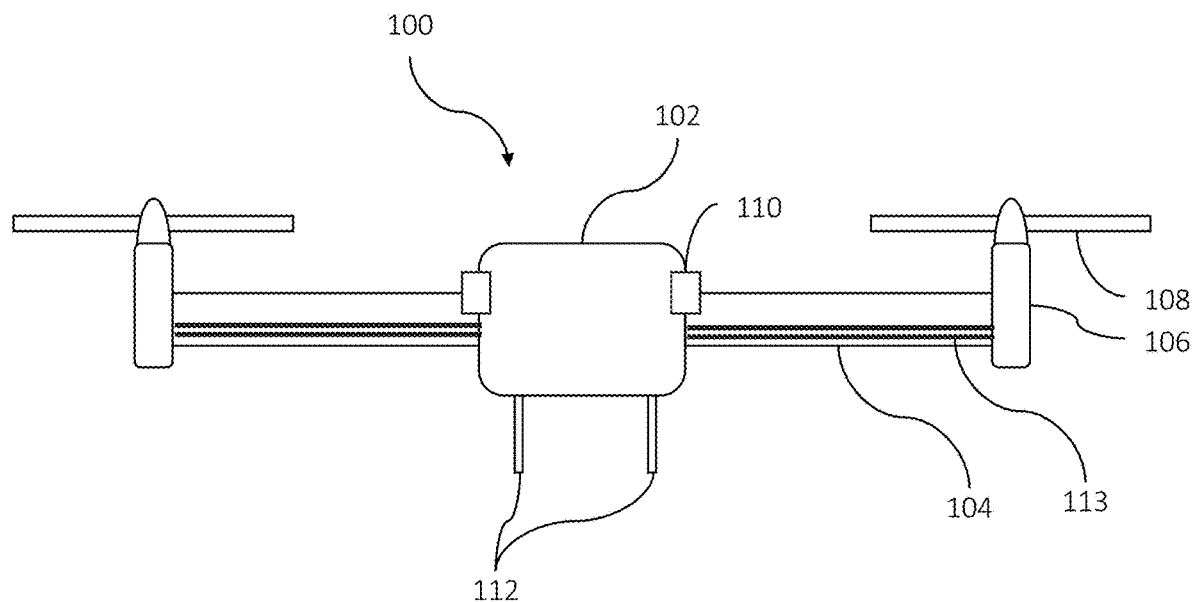
FIG. 2A is a front elevation view of an aerial vehicle with its tape spring arms in the extended state.
Figure 2B:
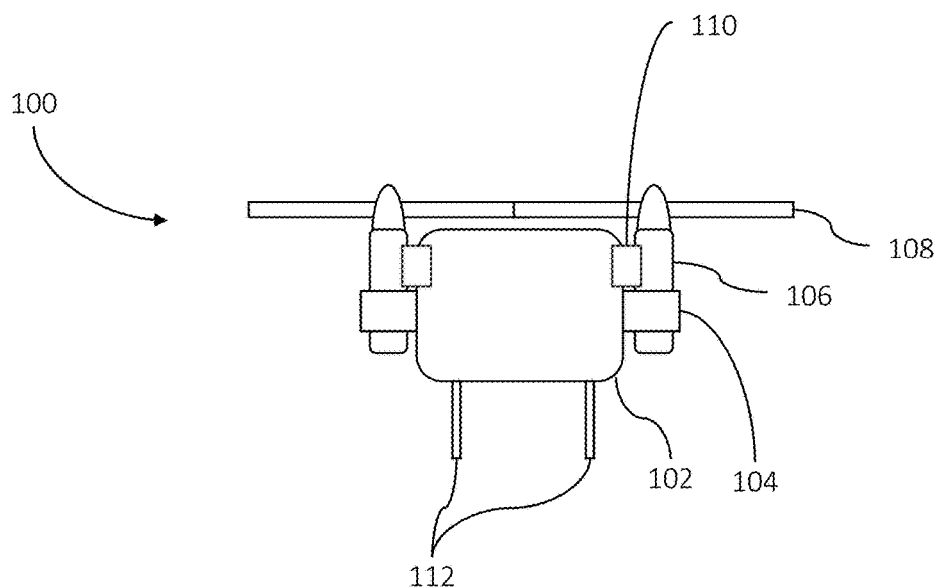
FIG. 2B is a front elevation view of an aerial vehicle with its tape spring arms in the contracted state.

FIGS. 1A and 2A show the aerial vehicle 100 with its four arms 104 in the expanded state. In this state, the aerial vehicle would be ready for operation. FIGS. 1B and 2B shows the aerial vehicle with this four arms in the contracted state. In this state, the aerial vehicle has a reduced footprint, which would be conducive for storage and transport. As shown in the figures, when the tape springs 104, or other arm construction, are in the extended state the distance between the main body 102 and rotors 106 is maximized. These figures also show how when the tape springs are in the contracted state the distance between the main body 102 and the rotors 106 is minimized.

During operation, the tape springs 104, or other arm construction, are held in the contracted state and prevented from extending radially outwards from the main body 102 by the associated locks 110 or other restraint. Once released, the outwardly biased tape springs extend causing the arms to displace the associated rotors 106 radially outward from the main body of the aerial vehicle from a contracted state to an extended state. Depending on the particular embodiment, this displacement of the rotors relative to the body may be substantially parallel to an axial direction of the tape springs. Once fully extended, the rotors may be held in the extended state due to the natural outward bias of the tape springs. Alternatively, in some embodiments, the tape springs may be locked in this extended configuration as well using any appropriate locking arrangement.

In certain embodiments, it may be desirable to transition the plurality of arms of an aerial vehicle from the extended state into the contracted state. This may be desirable, for example, when storing an aerial vehicle between flights. In certain embodiments, where each arm comprises at least one tape spring 104 as described above, the arms may be transitioned into the contracted state by applying a bending moment and elastically coiling the tape spring of each arm to retract the tape springs radially inward towards the main body 102. Correspondingly, this may cause the associated rotors 106 to displace radially inwards towards the main body in a direction that is substantially parallel to the axial direction of the tape springs. Once fully retracted to the contracted state, the motors may be locked in position by engaging the locks 110 with the corresponding tape springs 104 of the arms.

Figure 3A:
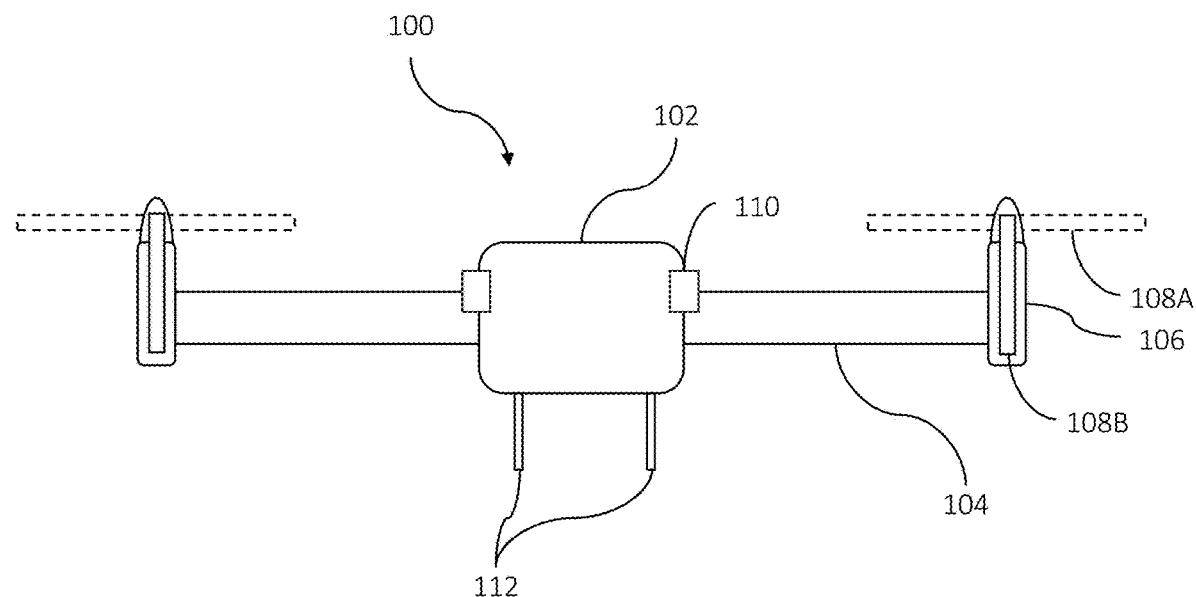
FIG. 3A is a front elevation view of an aerial vehicle with its tape spring arms in the extended state and rotor assemblies in the collapsed state.
Figure 3B:
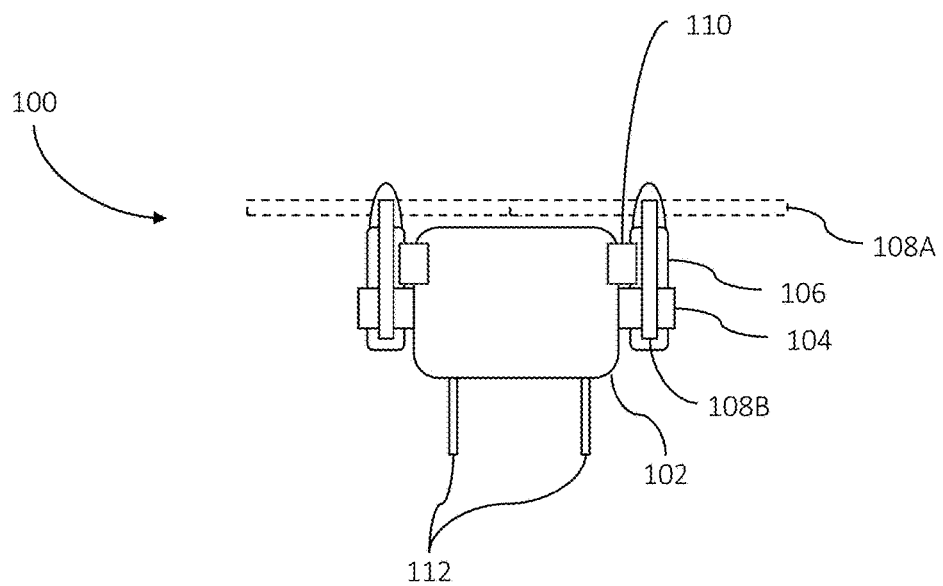
FIG. 3B is a front elevation view of an aerial vehicle with its tape spring arms in the contracted state and rotor assemblies in the collapsed state.

FIGS. 3A and 3B show a second embodiment of an aerial vehicle 100 with collapsible arms similar to the embodiment described above with regards to FIGS. 1A-2B. In this embodiment, the blades 108 of each rotor 106 are configured to be selectively moved between an expanded state 108A, indicated by the dashed lines, and a collapsed state 108B, indicated by the solid lines. The blades may either be biased towards the expanded state, alternatively, rotating the blades and/or applying a downwards thrust may displace the blades into the expanded state. In either case, the blades may be configured to be in the collapsed state when not being used and in the expanded state during use. Such an embodiment may help to reduce a footprint of the system when not in use.

Figure 4A:
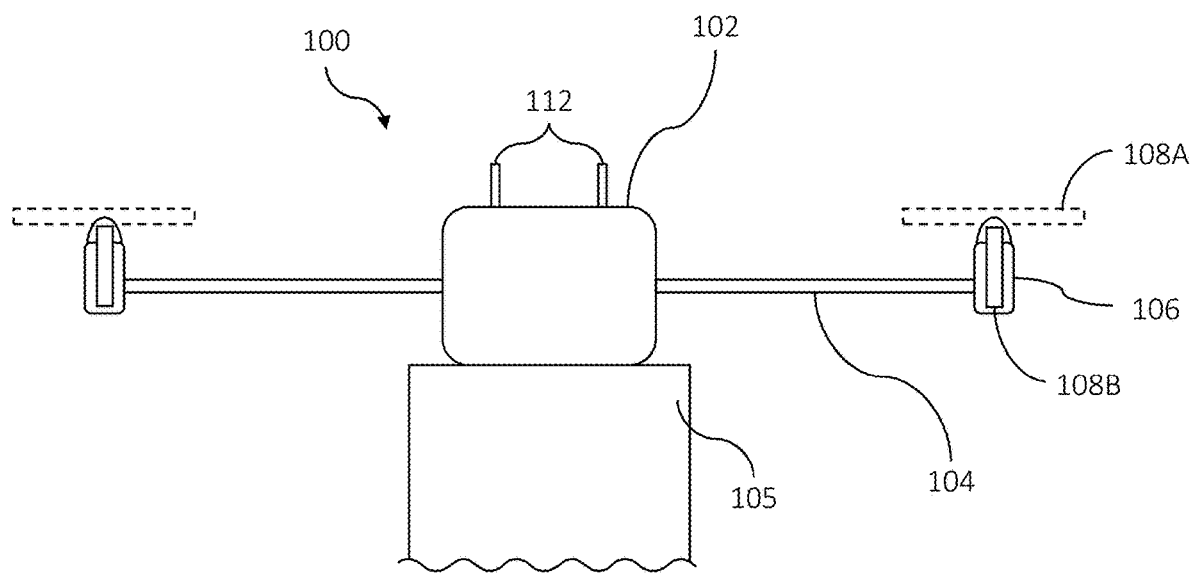
FIG. 4A is a front elevation view of an aerial vehicle with its tape spring arms in the extended state and rotor assemblies in the collapsed state.
Figure 4B:
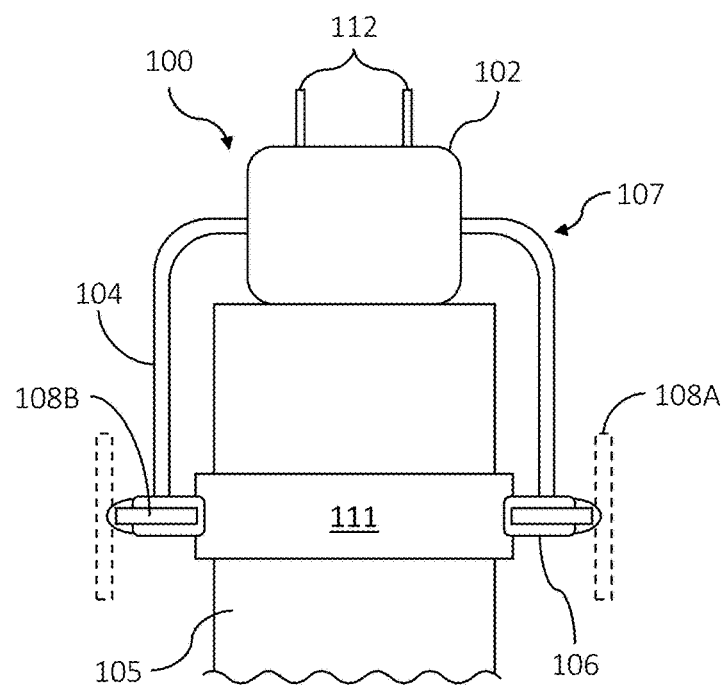
FIG. 4B is a front elevation view of an aerial vehicle with its tape spring arms in the contracted state and rotor assemblies in the collapsed state.

FIGS. 4A and 4B show a third embodiment of an aerial vehicle 100 with collapsible arms. In this embodiment, the tape springs 104 are configured to conform around at least a portion of the main body 102 of the vehicle as well as around a secondary body 105 in the contracted state. In other words, the shape and aspect ratio of the arms may change between the extended and contracted states to reduce the overall footprint of the aerial vehicle. In some embodiments, the tape springs 104 may include at least one bend 107, where the tape springs 104 change direction. As shown in FIG. 4B, the bending of tape springs 104 may reduce a footprint of the system when not in use (e.g. in the contracted state). As described previously, one or more locks 111 may be associated with each of the one or more tape springs 104 in the contracted state. The locks may have any appropriate construction capable of restraining motion of the one or more arms and may include portions located on either of the main body, the secondary body, or both. While the aerial vehicle 100 is shown to be adjacent to the secondary body 105 at the extended state in FIG. 4A, it should be appreciated that the aerial vehicle 100 may be able to detach or otherwise separate from the secondary body 105 at the extended state.

During operation, the tape springs 104, or other arm construction, are held in the contracted state and prevented from extending upward toward the main body 102 by the associated locks 111 or other restraint. Once released, the biased tape springs may deflect or otherwise elastically deform away from the secondary body 105, causing the arms to displace the associated rotors 106 radially outward from the main body 102 and secondary body 105 from a contracted state to an extended state, as shown in FIG. 4A. It should be appreciated that in embodiments where the tape springs 104 conform to at least a portion of the secondary body 105, the blades 108 of each rotor 106 may be configured to be selectively moved between an expanded state 108A, indicated by the dashed lines, and a collapsed state 108B, indicated by the solid lines, as described previously. Given the conformation of the tape springs 104 and rotors 106 around the secondary body 105, the blades 108 may remain in the expanded state 108A or a partial expanded state when the tape springs 104 are in the contracted state, as the expansion of the blades 108 may not significantly increase the footprint of the vehicle.

In some embodiments, the secondary body 105 may be part of an aerial vehicle delivery system, such as a high-speed propulsion device, including, but not limited to, a rocket or a sling-shot, although other embodiments of the delivery system are also contemplated. The aerial vehicle 100 may be loaded on the secondary body 105 in the contracted state while the secondary body 105 delivers the aerial vehicle 100 to a location where the aerial vehicle 100 may be deployed. In some embodiments, the secondary body 105 may be able to deliver the aerial vehicle 100 to different (e.g. higher) elevations and/or at different speeds (e.g. faster) than may be possible with the aerial vehicle 100 alone. It should be appreciated that the secondary body 105 may also be a stationary support system, or any other suitable support for the aerial vehicle 100 in the contracted state, as the present disclosure is not so limited.

It should be appreciated that the tape springs 104 may conform or otherwise elastically deform around the main body 102 and/or the secondary body 105 to reduce the distance between the main body 102 and the rotors 106 in the contracted state. In other words, the tape springs 104 may be wrapped around or contracted in any suitable manner to reduce the overall footprint of the aerial vehicle 100 in the contracted state. For example, the tape springs 104 may conform around the main body 102 such that the rotors are located flush against a surface of the main body 102. In this exemplary embodiment, the footprint of the aerial vehicle 100 in the contracted state is substantially equal to the footprint of the main body 102 and the rotors 106 as the tape springs 104 are flush against the main body 102. As described previously, the tape springs 104 may be sufficiently elastic to be able to conform around the main body 102 and may be able to undergo more than one bend 107 to conform around the main body 102 and/or the secondary body 105 to reduce the overall footprint of the aerial vehicle in the contracted state.

While the above embodiment has shown an aerial vehicle mounted on a secondary body for launch purposes, it should be understood that the depicted embodiment may be used without the secondary launch structure. For example, if the aerial vehicle were not mounted on the secondary body in the depicted figure, the tape spring arms might be elastically deformed around the vehicle body rather than along a portion of the body and the secondary launch structure. Additionally, the other embodiments of aerial vehicles disclosed herein may be mounted on a secondary launch structure as the disclosure is not limited to using a launch structure only with the above embodiment.

Figure 5:
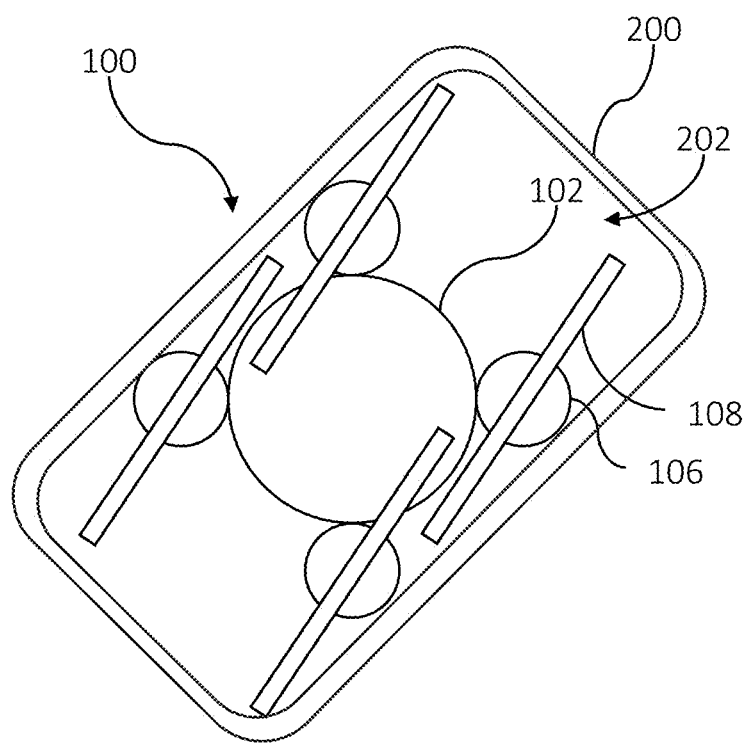
FIG. 5 is a top plan view of an aerial vehicle with its tape spring arms in the contracted state, the aerial vehicle housed within a canister.

FIG. 5 shows a fourth embodiment of an aerial vehicle 100 with collapsible arms as part of a system further comprising a container including an internal cavity. Specifically, FIG. 5 shows an aerial vehicle 100 disposed inside an interior cavity 202 of a container 200. As shown, the arms of the aerial vehicle, not depicted, are contracted, minimizing the distance between main body 102 and rotors 106. In this embodiment, blades 108 are shown in the expanded state, however it should be appreciated that they may be in the collapsed state described earlier in alternate embodiments. While the aerial vehicle is disposed within the internal cavity of the container, the walls of the cavity prevent the rotors from expanding radially outwards to the extended state. However, upon removal of the aerial vehicle from the cavity, the arms, and associated rotors may extend radially outwards from the main body as described above. In some embodiments, the container 200 may be used with and/or part of the secondary body 105. For example, the container 200 may be a sabot located on or within a rocket or other secondary body 105. The aerial vehicle 100 may then be stored in an interior cavity 202 of the sabot 200 in the contracted state while the rocket 105 is transporting the aerial vehicle 100. It should be appreciated that the container 200 may be able to container the aerial vehicle 100 in either the contracted or extended state.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope disclosed herein. Accordingly, the foregoing description and drawings are by way of example only.

What is claimed is:

1. An aerial vehicle comprising:
a main body; and
a plurality of flexible arms connected to and extending radially outward from the main body, wherein each flexible arm of the plurality of flexible arms comprises:
a rotor connected to an associated flexible arm, wherein each flexible arm is configured to move between a contracted state and an extended state relative to a rigid connection to the main body, and wherein deforming each flexible arm between the contracted state and the extended state displaces the associated rotor radially outward from the main body, wherein each flexible arm of the plurality of flexible arms is configured to move between the contracted state and the extended state by radial elongation of the flexible arm.

2. The aerial vehicle of claim 1, wherein each of the plurality of flexible arms additionally comprise at least one tape spring configured to deform between the contracted state and the extended state to displace the associated rotor radially outward from the main body.

3. The aerial vehicle of claim 2, wherein the plurality of flexible arms additionally comprise at least two electrical conductors extending along at least a portion of a length of the at least one tape spring.

4. The aerial vehicle of claim 2, wherein the at least one tape spring of each of the plurality of flexible arms is biased towards the extended state.

5. The aerial vehicle of claim 4, further comprising a lock configured to selectively restrain the plurality of flexible arms in the contracted state.

6. The aerial vehicle of claim 1, wherein each rotor is configured to transition between a collapsed state and an expanded state.

7. A system comprising:
a container including an internal cavity; and
the aerial vehicle of claim 1 disposed in the internal cavity of the container with the plurality of flexible arms in the contracted state, wherein the plurality of flexible arms are configured such that removing the aerial vehicle from the internal cavity causes the plurality of flexible arms to deform from the contracted state to the extended state.

8. A method of deploying an aerial vehicle, the method comprising:
extending a plurality of flexible arms of the aerial vehicle radially outward from a main body of the aerial vehicle from a contracted state to an extended state, wherein each flexible arm of the plurality of flexible arms includes a rotor connected to the associated flexible arm, and wherein extending each flexible arm between the contracted state and the extended state relative to a rigid connection to the main body moves the associated rotor radially outwards relative to the main body, wherein extending the plurality of flexible arms radially outwards includes radial elongation of the plurality of flexible arms.

9. The method of claim 8, wherein each of the plurality of flexible arms comprises at least one tape spring.

10. The method of claim 9, further comprising biasing the at least one tape spring of each flexible arm radially outwards.

11. The method of claim 10, further comprising locking the plurality of flexible arms in the contracted state.

12. The method of claim 11, further comprising unlocking the plurality of flexible arms to permit the plurality of flexible arms to extend from the contracted state to the extended state.

13. The method of claim 8, wherein extending the plurality of flexible arms of the aerial vehicle radially outward maximizes the distance between the rotor and the main body.

14. The method of claim 8, further comprising contracting each of the plurality of flexible arms radially inward towards the main body of the aerial vehicle, and wherein deforming each arm between the extended state and the contracted state moves the associated rotor radially inwards relative to the main body.

15. The method of claim 14, wherein contracting the plurality of flexible arms of the aerial vehicle radially inwards minimizes the distance between each rotor and the main body.

16. The method of claim 8, further comprising transitioning the rotor associated with each of the plurality of flexible arms from a collapsed state to an expanded state.

17. An aerial vehicle comprising:
 a main body;
 at least one tape spring attached to and extending outward from the main body; and
 a rotor connected to a distal portion of the at least one tape spring located opposite a proximal portion of the at least one tape spring attached to the main body, wherein the at least one tape spring is biased towards an extended state, and wherein the at least one tape spring is configured to move to the extended state from a contracted state by radial elongation.

18. The aerial vehicle of claim 17, further comprising at least two electrical conductors extending along at least a portion of a length of the at least one tape spring.

19. The aerial vehicle of claim 17, further comprising a lock configured to selectively restrain the at least one tape spring in a contracted state.

20. The aerial vehicle of claim 17, wherein each rotor is configured to transition from a collapsed state to an expanded state.

* * * * *